United States Patent
Satou

(10) Patent No.: US 7,410,018 B2
(45) Date of Patent: Aug. 12, 2008

(54) VEHICLE BODY FRONT STRUCTURE

(75) Inventor: Kenichi Satou, Tokyo (JP)

(73) Assignee: Fuji Jukogyo Kabushiki Kaisha, Shinjuku-ku, Tokyo (JP)

( * ) Notice: Subject to any disclaimer, the term of this patent is extended or adjusted under 35 U.S.C. 154(b) by 366 days.

(21) Appl. No.: 10/096,684

(22) Filed: Mar. 14, 2002

(65) Prior Publication Data
US 2002/0129981 A1    Sep. 19, 2002

(30) Foreign Application Priority Data
Mar. 15, 2001    (JP)    ............ P. 2001-074428

(51) Int. Cl.
*B60K 11/04*    (2006.01)
(52) U.S. Cl. ............ 180/68.4; 180/68.6; 293/121; 293/115; 293/109
(58) Field of Classification Search ............ 180/68.1, 180/68.2, 68.4, 68.6, 69.1, 68.5; 293/155, 293/122, 121, 109, 132, 120, 107, 115, 135; 296/187.03, 193.09, 187.09, 203.02, 193.08, 296/189
See application file for complete search history.

(56) References Cited

U.S. PATENT DOCUMENTS

| | | | | |
|---|---|---|---|---|
| 3,744,835 A * | 7/1973 | Carbone et al. | ........ | 296/193.08 |
| 3,869,165 A * | 3/1975 | Miller | ........ | 293/121 |
| 3,884,516 A * | 5/1975 | Gallion et al. | ........ | 293/120 |
| 3,917,332 A * | 11/1975 | Puleo | ........ | 293/109 |
| 3,926,463 A * | 12/1975 | Landwehr et al. | ........ | 296/187.09 |
| 4,938,303 A * | 7/1990 | Schaal et al. | ........ | 180/68.1 |
| 5,066,057 A * | 11/1991 | Furuta et al. | ........ | 293/121 |
| 5,080,411 A * | 1/1992 | Stewart et al. | ........ | 293/122 |
| 5,139,297 A * | 8/1992 | Carpenter et al. | ........ | 293/132 |
| 5,271,473 A * | 12/1993 | Ikeda et al. | ........ | 180/68.4 |
| 5,409,288 A * | 4/1995 | Masuda | ........ | 296/203.02 |
| 5,435,619 A | 7/1995 | Nakae et al. | | |
| 5,573,299 A * | 11/1996 | Masuda | ........ | 296/193.09 |
| 5,984,389 A * | 11/1999 | Nuber et al. | ........ | 293/109 |
| 6,003,912 A * | 12/1999 | Schonhoff et al. | ........ | 293/122 |
| 6,260,609 B1 * | 7/2001 | Takahashi | ........ | 180/68.4 |
| 6,287,442 B1 * | 9/2001 | Tarahomi | ........ | 204/479 |

(Continued)

FOREIGN PATENT DOCUMENTS

DE    198 13 163 A1    10/1998

(Continued)

OTHER PUBLICATIONS

European Search Report dated Jan. 29, 2003.

(Continued)

*Primary Examiner*—Hau Phan
(74) *Attorney, Agent, or Firm*—McGinn IP Law Group, PLLC

(57) ABSTRACT

A lower member of a radiator core support includes a front end module formed so as to protrude forward, so that a protruding portion of the lower member is used as an impact absorbing frame member. A lower end portion of a bumper face may be superimposed fixedly on a lower surface of the protruding portion. A lower impact absorbing portion may be made of foamed resin and may be accommodated in the interior of a lower protruding portion, and this lower impact absorbing portion may be fixedly provided at a front end surface of the protruding portion.

49 Claims, 6 Drawing Sheets

U.S. PATENT DOCUMENTS

| | | | |
|---|---|---|---|
| 6,293,615 B1 * | 9/2001 | Tarahomi | 296/193.09 |
| 6,412,581 B2 * | 7/2002 | Enomoto et al. | 180/68.4 |
| 6,435,577 B1 * | 8/2002 | Renault | 180/69.1 |
| 6,467,822 B1 * | 10/2002 | Leng | 293/121 |
| 6,547,317 B1 * | 4/2003 | Cheron et al. | 296/193.01 |
| 6,676,179 B2 * | 1/2004 | Sato et al. | 293/115 |
| 6,681,876 B1 * | 1/2004 | Haneda et al. | 180/68.4 |

FOREIGN PATENT DOCUMENTS

| | | |
|---|---|---|
| DE | 100 42 037 A1 | 3/2001 |
| EP | 1 067 039 A1 | 1/2001 |
| JP | 10244889 A * | 9/1998 |
| JP | 11152062 A * | 6/1999 |
| JP | 2000-06739 | 11/2000 |
| JP | 2001-18838 | 1/2001 |
| WO | WO 01/00478 A1 | 1/2001 |

OTHER PUBLICATIONS

Patent Abstracts of Japan vol. 2000, No. 04, Aug. 31, 2000.

* cited by examiner

VEHICLE BODY FRONT STRUCTURE

BACKGROUND OF THE INVENTION

The present invention relates to a vehicle body front structure and more particularly to the structure of a front end module for holding at least a radiator core and a condenser.

As is disclosed in, for example, Japanese Patent Laid-open 2001-18838, as a front end module disposed at a front end portion of a vehicle body, a front end module is widely used in general in which headlamp housings are integrally provided on a radiator core support for holding a radiator core and a condenser.

In the front end module of this type, a bumper beam is mounted at a position confronting an upper portion side of a front bumper face, and an impact absorbing member made of foamed resin is disposed between the bumper beam and the bumper face.

Incidentally, in recent years, there have been proposed body structures in which impact is designed to be aggressively absorbed not only at an upper portion of a front bumper but also at a lower portion of the front bumper from a point of view regarding a pedestrian protection. In addition, disclosed in, for example, Japanese Patent Laid-open 2000-6739 is a technology in which a bracket is interposed between a front bumper face and a cross member for fixedly mounting a lower portion of the bumper face to the cross member on the vehicle body. A plurality of mounting wall surfaces is adapted to overlap a front surface of the cross member. Pairs of vertical surfaces are extended forward from both sides of the respective mounting wall surfaces in such a manner as to be substantially normal to a transverse direction of the vehicle are formed integrally with the bracket. Mounting locations to the cross member are provided on the respective mounting surfaces. According to this technology, the respective vertical surfaces function as impact absorbing members from the lower portion of the front bumper face.

However, as has been described above, in order to have a structure in which impact can be absorbed at the lower portion of the front bumper as well, there occurs a need to provide additionally a cross member for holding an impact absorbing member at a position confronting the lower portion of the front bumper face ahead of the front end module. The additional member like this leads to risks that the body structure is made complicated and that the production costs are increased highly.

SUMMARY OF THE INVENTION

The present invention was made in these situations, and an object thereof is to provide a vehicle body front structure which can realize proper absorption of impact even at a lower portion of a front bumper with a simple structure.

With a view to solving the problem, according to a first aspect of the present invention, there is provided a vehicle body front structure comprising:

a front end module disposed at a front end of a vehicle body and including a radiator core support for holding at least a radiator core and a condenser; and a front bumper including a lower portion provided with an impact absorbing member;

wherein the radiator core support includes a lower member provided with a protruding portion that is disposed at a front portion of the lower member and is protruded forwardly, and the impact absorbing member is supported by the protruding portion, to thereby absorb an impact that is applied to the lower portion of the front bumper.

According to a second aspect of the present invention, there is provided a vehicle body front structure as set forth in the first aspect of the present invention, wherein the transverse length of the protruding portion is set to be substantially equal to the transverse length of a bumper beam disposed forward of the radiator core support.

According to a third aspect of the present invention, there is provided a vehicle body front structure of as set forth in the first or second aspect of the present invention, wherein a front end surface of the protruding portion is formed so as to become substantially parallel to a front end surface of the bumper beam disposed forward of the radiator core support.

DETAILED DESCRIPTION OF THE PREFERRED EMBODIMENTS

Figure 1:
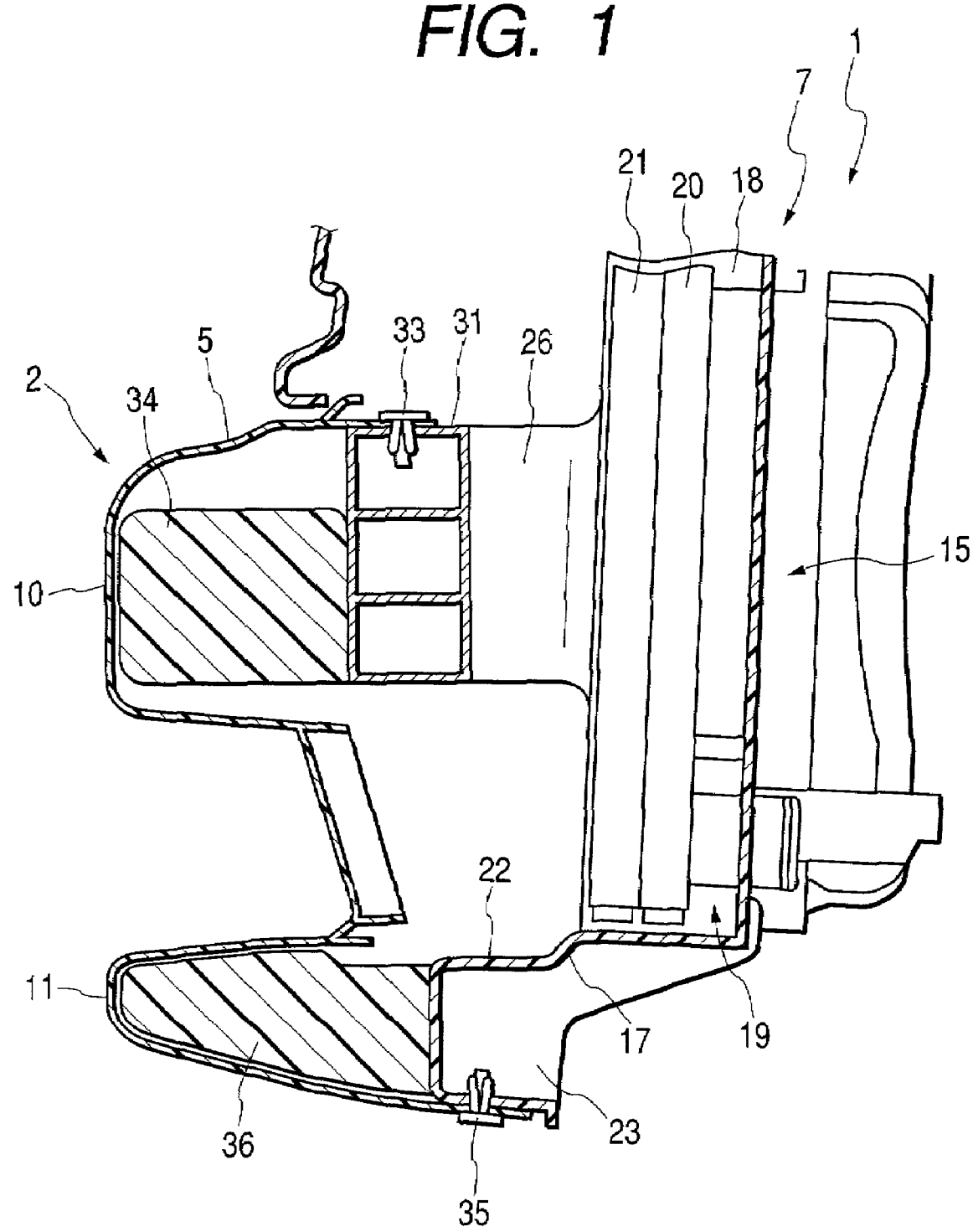
FIG. 1 shows a longitudinally vertical sectional view showing a main part of a body in the vicinity of a front bumper according to a first embodiment of the present invention.
Figure 2:
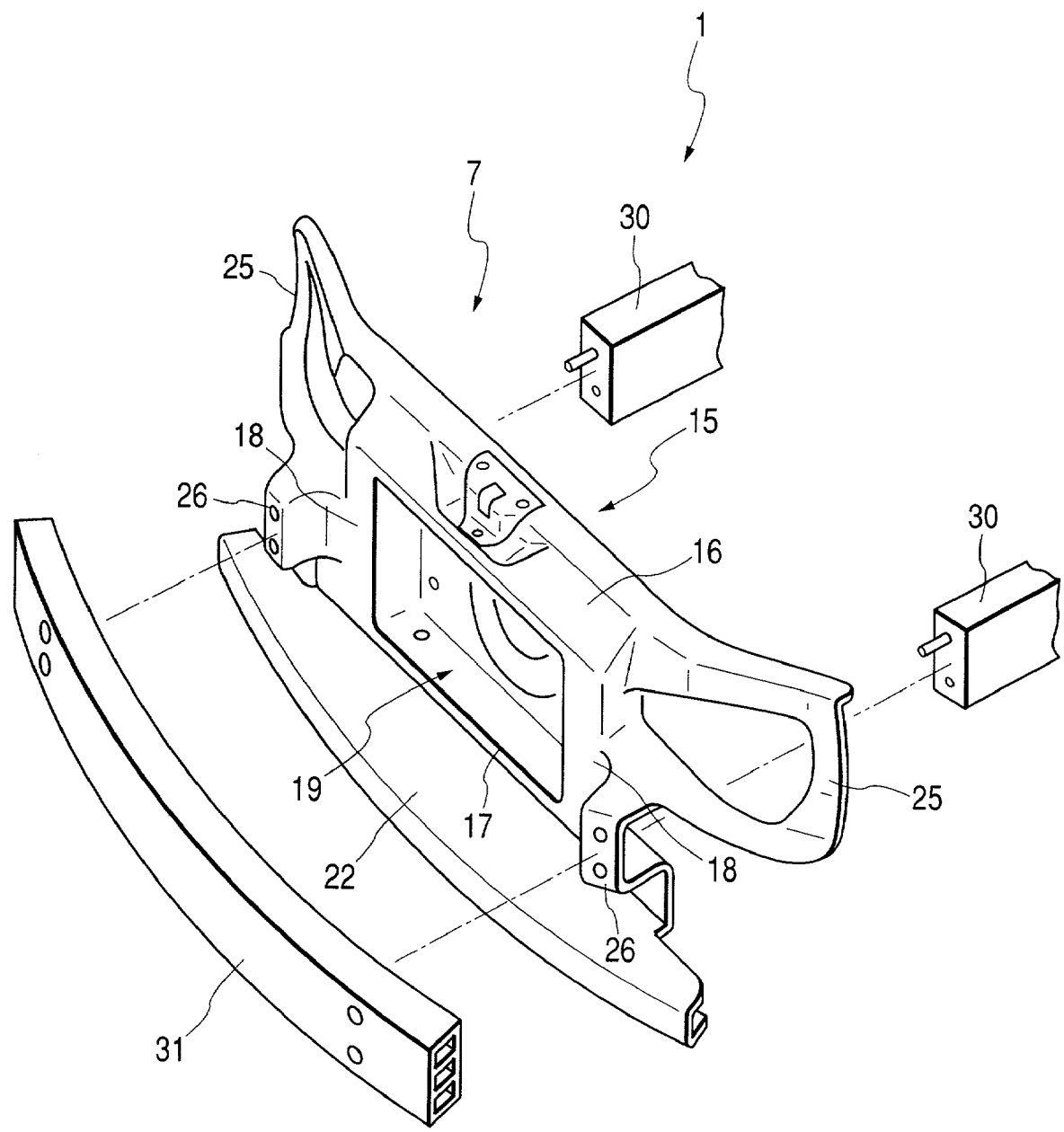
FIG. 2 shows a perspective view of a front end module according to the first embodiment of the present invention.
Figure 3:
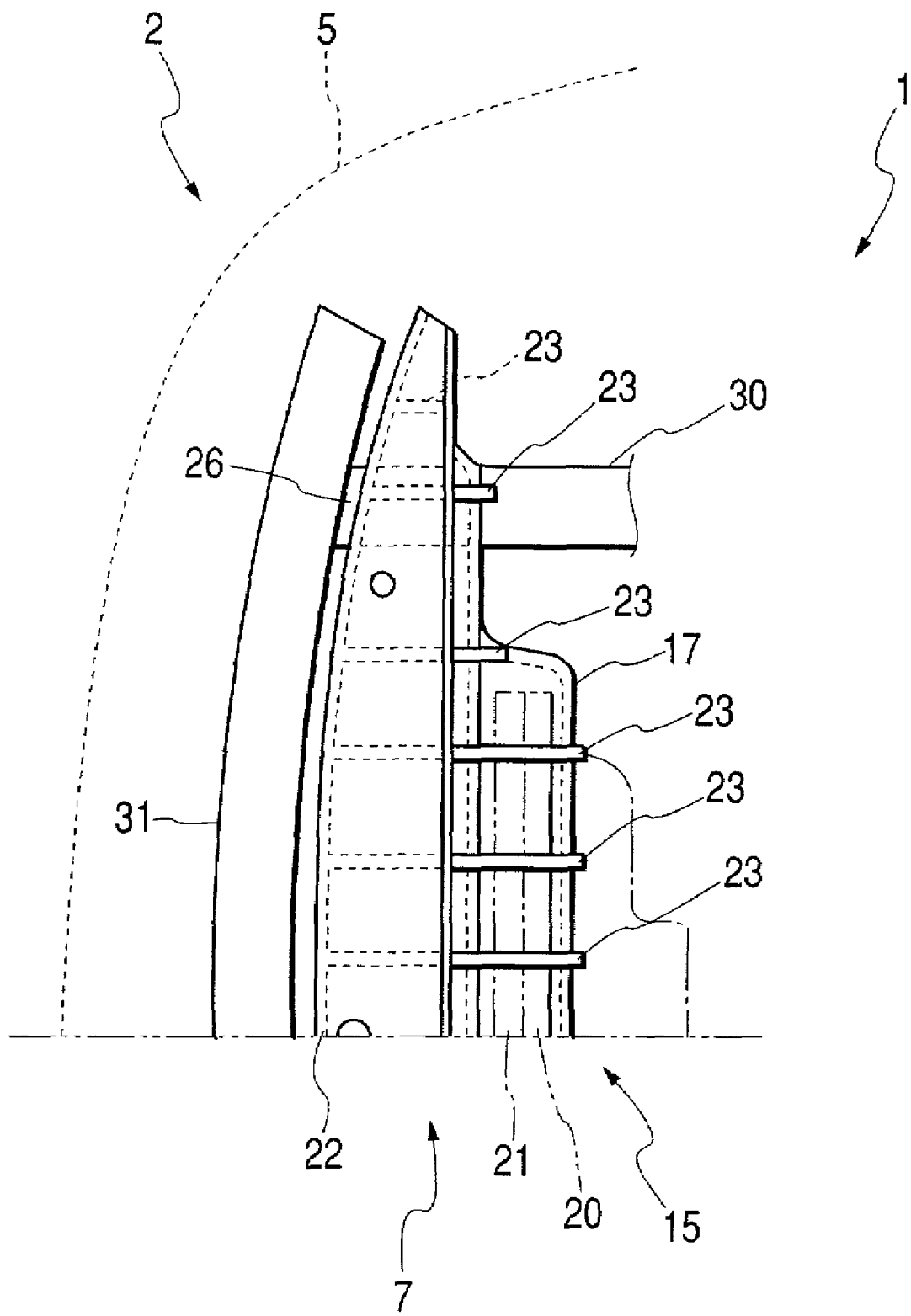
FIG. 3 shows a plan view of the main part in the vicinity of the front bumper according to the first embodiment of the present invention as viewed from below.

A mode for carrying out the present invention will be described below with reference to the appended drawings. FIGS. 1 to 3 show a first embodiment of the present invention, in which FIG. 1 is a longitudinally vertical sectional view showing a main part of a vehicle body in the vicinity of a front bumper, FIG. 2 is a perspective view of a front end module, and FIG. 3 is a plan view of a portion of the vehicle body in the vicinity of the front bumper as viewed from below.

In FIG. 1, reference numeral 1 denotes a vehicle body, and reference numeral 2 denotes a front bumper. A front end module 7 of the body 1 is disposed to the rear of a bumper face 5 constituting the front bumper 2 in such a manner as to be opposed to the bumper face 5, and the bumper face 5 is mounted to the vehicle body 1 via the front end module 7.

To describe specifically, the bumper face 5 is constituted by a resin-molded one-piece component having an upper protruding portion 10 and a lower protruding portion 11 formed on a front side thereof at positions which are vertically spaced apart at a predetermined distance, so that in case a pedestrian is hit by the vehicle at the front portion of the vehicle, the legs of the pedestrian are hit first by the upper protruding portion 10 and the lower protruding portion 11.

The front end module 7 is designed to be molded into one piece through resin molding and is constructed so as to have a radiator core support 15 for holding a radiator core 20 and a condenser 21 (refer to FIG. 1). As shown in FIG. 2, the radiator core support 15 has an upper member 16 and a lower member 17 which extend in the transverse direction of the vehicle and a pair of side members 18 for connecting the upper member 16 to the lower member 17 vertically, and the radiator core 20 and the condenser 21 are held in an accommodating portion 19 which is constituted by the members 16, 17 and 18.

Here, as shown in FIGS. 1 to 3, a front portion of the lower member 17 constituting the radiator core support 15 is formed so as to protrude forwarder than the accommodating portion 19. A protruding portion 22 of the lower member 17 is formed in such a manner as to be opposed substantially in parallel to a vertical surface of the lower protruding portion 11 formed on the bumper face 5 along substantially the full length thereof in the transverse direction at a position longitudinally spaced apart from the lower protruding portion 11 at a predetermined distance. Namely, a front end surface of the protruding portion 22 is formed into a configuration which extends along the vertical surface of the lower protruding portion 11 of the bumper face 5, and ends of the protruding portion 22 extend transversely in such a manner that the protruding portion 22 is opposed to the lower protruding portion 11 along substantially the full length thereof. In addition, a plurality of ribs 23 are provided on a back side of the lower member 17 for reinforcing the protruding portion 22.

As shown in FIG. 2, lamp housings 25 are formed integrally on both sides of the radiator core support 15, hollow brackets 26 are formed to protrude forward at bottom portions of the lamp housings 25. Front ends of front side members 30 constituting the vehicle body 1 are inserted into hollow portions of the brackets 26 from the rear, and a bumper beam 31 extending in the transverse direction is brought into abutment with front sides of the brackets 26, whereby the front end module 7 and the bumper beam 31 are mounted to the front side members 30 by fastening these members together with bolts.

Here, a front end surface of the bumper beam 31 is formed in such a manner as to be opposed substantially in parallel to a vertical surface of the upper protruding portion 10 of the bumper face 5 along substantially the full length thereof at a position spaced apart from the vertical surface of the upper protruding portion 10 at a predetermined distance. Consequently, the transverse length of the bumper beam 31 is set to be substantially equal to the transverse length of the protruding portion 22 of the lower member 17, and the front end surface of the bumper beam 31 is set to become substantially parallel to the front end surface of the protruding portion 22.

An upper end portion of the bumper face 5 which extends to the rear above the upper protruding portion 10 is superimposed on an upper surface of the bumper beam 31, and the upper end portion is fixedly mounted on the bumper beam 31 via clips 33. In addition, an upper impact absorbing member 34 made of foamed resin is fixedly provided on the front end surface of the bumper beam 31, so that the upper impact absorbing member 34 is accommodated in the interior of the upper protruding portion 10.

On the other hand, a lower end portion of the bumper face 5 which extends the rear below the lower protruding portion 11 is superimposed on a lower surface of the protruding portion 22 which is formed on the lower member 17 to protrude therefrom, and the lower end portion is fixedly mounted on the lower protruding portion 22 via clips 35. In addition, a lower impact absorbing member 36 made of foamed resin is fixedly provided on a front end surface of the protruding portion 22, so that the lower impact absorbing member 36 is accommodated in the interior of the lower protruding portion 11. In this case, the lower impact absorbing member 36 is set to have a larger strength resisting an impact load than the upper impact absorbing member 34.

Next, the operation of the vehicle body front structure according to the first embodiment of the present invention will be described below.

In case a pedestrian is hit by the vehicle at the front portion of the vehicle, the legs of the pedestrian are hit first by the upper protruding portion 10 and the lower protruding portion 11 formed on the bumper face 5 of the front bumper 2 in such a manner as to protrude therefrom.

Portions of the legs which are in the vicinity of the knees are hit mainly by the upper protruding portion 10, which is then deformed backward while absorbing an impact from the leg portions in the vicinity of the knees. Then, the impact is transmitted further to the upper impact absorbing member 34, which is then deformed while absorbing the impact transmitted thereto.

Simultaneously, portions of the legs below the knees are hit mainly by the lower protruding portion 11, which is deformed to backward while absorbing an impact from the leg portions below the knees. The impact is transmitted further to the lower impact absorbing member 36, which is deformed while absorbing the impact transmitted thereto.

As this occurs, since the lower impact absorbing member 36 is set to have a larger strength resisting impact load than the upper impact absorbing member 34, the lower impact absorbing member 36 takes up the portions of the legs below the knees while absorbing the impact, whereby the pedestrian is led onto the hood of the engine compartment without a risk that the leg portions below the knees are taken under the vehicle body 1. Consequently, the damage that would otherwise be made to the knee joints of the pedestrian can be reduced effectively.

According to this embodiment, since the lower member 17 of the radiator core support 15 constituting the front end module 7 is formed so as to protrude forward and the protruding portion 22 of the lower member 17 is used as an impact absorbing frame member, the impact absorbing function at the lower portion of the front bumper 2 can be realized without calling for a complicated body structure and an increase in production costs which are attributed to the addition of the new member such as a cross member.

In this case, since it is the resin molded component which is formed integrally with the front end module 7, the protruding portion 22 is light in weight, and moreover, since the plurality of ribs 23 are provided on the back side of the lower member 17, the strength required for the frame member is ensured.

In addition, since the protruding portion 22 is set to extend transversely in such a manner that the protruding portion 22 confronts the vertical surface of the lower protruding portion along substantially the full length thereof and the transverse length of the protruding portion 22 is set to become substantially equal to the transverse length of the bumper beam 31, impact absorption can be realized along substantially the full length of the lower portion of the front bumper 2 in the transverse direction, whereby in case a pedestrian is hit by the front bumper 2, unevenness in impact absorbing performance that would be caused by different impact positions can be prevented.

Furthermore, since the front end surface of the protruding portion 22 is formed so as to become substantially parallel to the front end surface of the bumper beam 31, the relative impact absorbing performance between the upper portion and the lower portion of the front bumper 2 can be tuned with ease.

Figure 4:
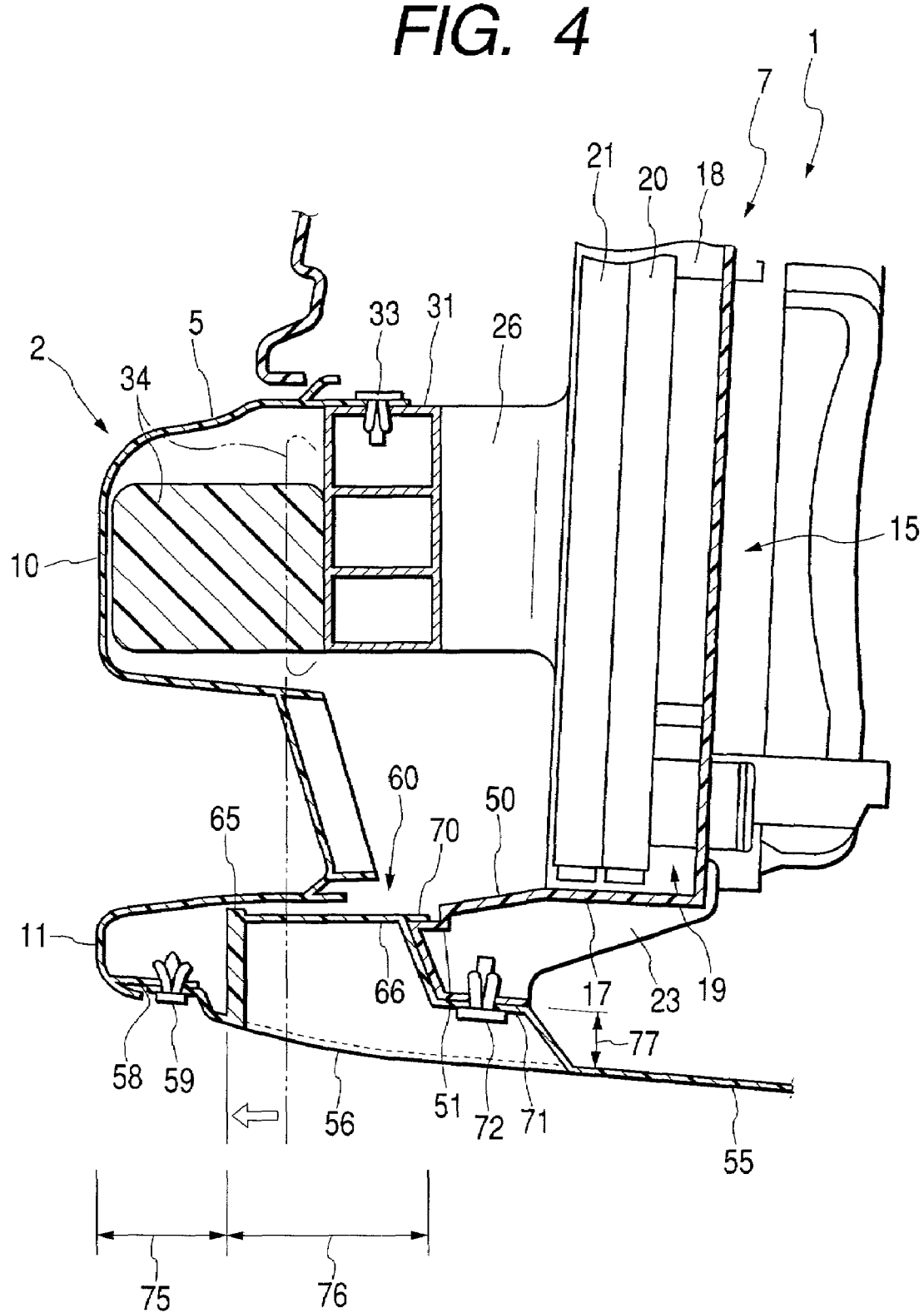
FIG. 4 shows a longitudinally vertical sectional view showing a main part of a body in the vicinity of a front bumper according to a second embodiment of the present invention.
Figure 5:
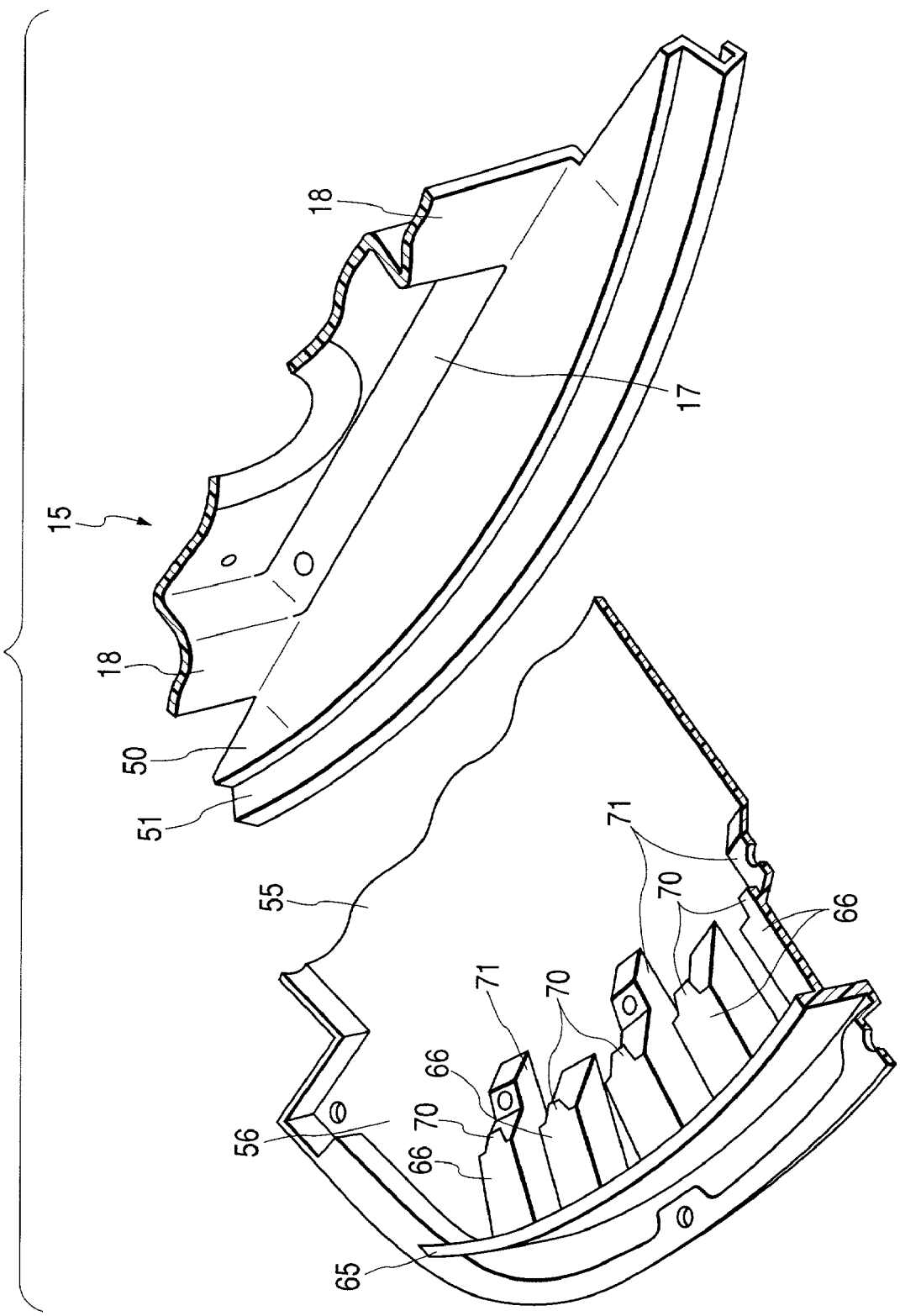
FIG. 5 shows an exploded perspective view showing main parts of a front end module and an under cover according to the second embodiment of the present invention.
Figure 6:
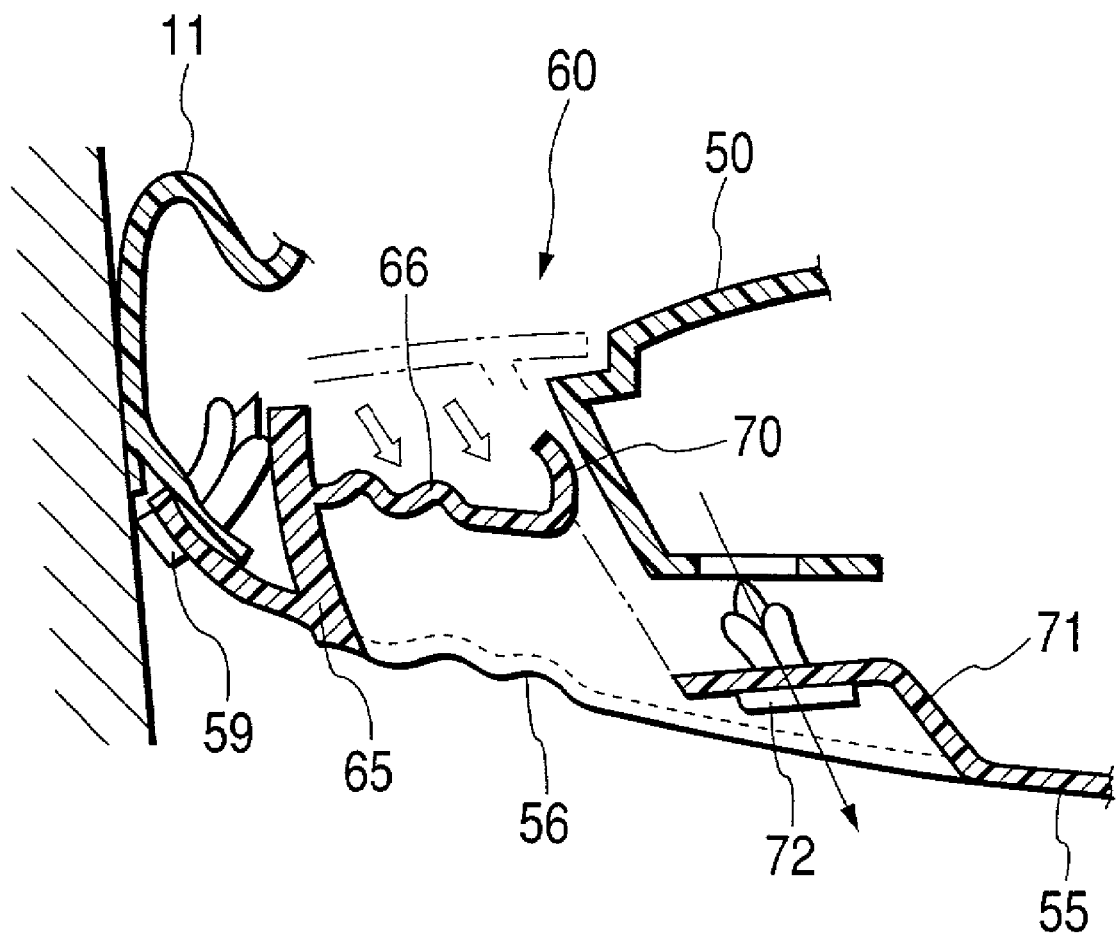
FIG. 6 shows a longitudinal vertical sectional view of the main part according to the second embodiment of the present invention showing a state in which the front bumper is deformed at the time of collision.

Next, FIGS. 4 to 6 show a second embodiment of the present invention, in which FIG. 4 is a longitudinally vertical sectional view showing a main part of a vehicle body in the vicinity of a front bumper, FIG. 5 is an exploded perspective view showing main parts of a front end module and an under cover, and FIG. 6 is a longitudinally vertical view of the main part of the front bumper showing a state in which the front bumper is deformed at the time of collision. Note that in this embodiment, the structure for mounting the lower portion of the bumper face 5 to the vehicle body 1 is mainly different from the first embodiment, and in association with this, the configuration of the protruding portion of the lower member 17 and the structure of the lower impact absorbing member are modified. The other features remain the same, and therefore the description thereof will be omitted by imparting like reference numerals to like constituent components.

As shown in the drawings, in this embodiment, a protruding portion 50 is formed at the front of a lower member 17 so as to protrude therefrom. This protruding portion 50 is opposed substantially in parallel to a vertical surface of a lower protruding portion 11 formed on a bumper surface 5 along substantially the full length thereof in the transverse direction at a position which is longitudinally spaced apart from the vertical surface of the lower protruding portion 11 at a predetermined distance. A front end surface of the protruding portion 50 is inclined to the rear. A stepped locking portion 51 is formed at an upper end portion of the front end surface.

In addition, in the drawings reference numeral 55 denotes an under cover of a vehicle body 1 which is fixedly mounted to an engine cross member (not shown). A front portion of the under cover 55 extends forwarder than the protruding portion 50, and this extension is integrally formed as a mounting bracket 56 for the bumper face 5. The bracket 56 faces the interior of the lower protruding portion 11 of the bumper face 5, and protruding pieces 58 on the lower protruding portion 11 are fixedly mounted to a front end of the bracket 56 via clips 59.

Furthermore, a lower impact absorbing member 60 is integrally formed on the bracket 56, so that the lower impact absorbing member 60 is accommodated in the interior of the lower protruding portion 11. The lower impact absorbing member 60 comprises a rib 65 raised upright from the bracket 56 in such a manner as to be opposed to the vertical surface of the lower protruding portion 11 and a plurality of beads 66 disposed behind the rib 65 for transmitting an impact from rib 65 to the protruding portion 50.

As shown in FIG. 5, the length of the rib 65 is set to correspond to substantially the transverse length of the protruding portion 50 and the rib 65 is disposed to extend along the vertical surface of the lower protruding portion 11 substantially in parallel therewith at a position which is longitudinally spaced apart from the vertical surface at a predetermined distance. Here, as is shown in FIG. 4, the rib 65 is disposed forwarder than a position where impact absorption by the upper impact absorbing member 34 is completed.

As shown in FIGS. 4 and 5, the beads 66 are constituted by hollow rectangular protruding members which extend substantially longitudinally, and front end portions of the beads 66 are formed integrally with the rib 65 whereas rear end portions thereof are brought into abutment with the front end surface of the protruding portion 50.

In addition, a locking pawl 70 directed to the rear is formed in an upper surface of the bead 66, and this locking pawl 70 is constructed so as to be locked to a locking portion 51 of the protruding portion 50.

A stepped portion 71 is formed integrally at a rear portion of the bead 66 every a predetermined number of beads (in this embodiment, every other bead) for abutment with a lower surface of the protruding portion 50, and the stepped portions 71 are fixedly mounted to the protruding portion 50 via clips 72.

Then, with the structure as described above, the lower impact absorbing member 60 forms a low impact absorbing zone 75 and a high impact absorbing zone 76 in the interior of the lower protruding portion 11. Here, the high impact absorbing zone 76 is set to have a larger strength resisting impact load than the upper impact absorbing member 34 by the rib and the beads 66.

In addition, a predetermined gap 77 is formed between the bracket 56 and the protruding portion 50 by the stepped portion 71.

Next, the operation of the vehicle body front structure according to the second embodiment of the present invention will be described below.

In case a pedestrian is hit by the vehicle at the front portion of the vehicle, the legs of the pedestrian are hit first by the upper protruding portion 10 and the lower protruding portion 11 formed on the bumper face 5 of the front bumper 2 so as to protrude therefrom.

Portions of the legs in the vicinity of the knees are hit mainly by the upper protruding portion 10, which is then deformed backward while absorbing an impact from the leg portions in the vicinity of the knees. The impact is transmitted further to the upper impact absorbing member 34, which is then deformed while absorbing the impact so transmitted thereto.

Simultaneously, portions of the legs below the knees are hit mainly by the lower protruding portion 11, which is then deformed backward while absorbing an impact from the leg portions below the knees at the low impact absorbing zone 75. When the impact absorption by the low impact absorbing zone 75 is completed, then the impact is absorbed at the high impact absorbing zone 76.

Here, since an impact absorption initiating position of the high impact absorbing zone 76 (the position where the rib 65 is disposed) is set forwarder than an impact absorption completion position of the upper impact absorbing member 34 (indicated by two-dot chain lines in FIG. 4) and moreover since the high impact absorbing zone 76 is set to have a larger strength resisting impact load than the upper impact absorbing member 34, the lower protruding portion 11 takes up the leg portions below the knees while implementing a predetermined impact absorption at the high impact absorbing zone 76, whereby the pedestrian is led onto the hood of the engine compartment without a risk that the leg portions below the knees are taken under the vehicle body 1, thereby making it possible to effectively reduce the damage that would otherwise be made to the knee joints of the pedestrian.

In addition, as shown in FIG. 6, in case an impact which is larger in degree than an impact applied when a pedestrian is hit is applied to the front bumper 2, the lower impact absorbing member 60 is designed to drop through the gap 77. Namely, since the front end surface of the protruding portion 50 is inclined to the rear and moreover since the gap 77 is formed between the bottom surface of the protruding portion 50 and the bottom surface of the bracket 56 by the stepped portions 71 integrally formed on the lower impact absorbing member 60, in case an impact which is larger in degree than an impact applied when a pedestrian is hit is applied to the front bumper 2, whereby the locking pawls 70 and the clips 71 come off from the protruding portion 50, the lower impact absorbing member 60 is slid to the gap 77 side and drops without any delay, thereby making it possible to suppress a damage that would be made to the front end module 7 at the time of frontal collision.

According to the second embodiment of the present invention, in addition to the advantage obtained in the first embodiment, since the lower impact absorbing member 60 is formed integrally on the bracket 56 provided in such a manner as to extend from the under cover 55, the impact absorbing function can be provided at the lower portion of the front bumper 2 with the simpler structure having the limited number of components.

In addition, in case an impact which is larger in degree than an impact applied when a pedestrian is hit is applied to the front bumper 2, the lower impact absorbing member 60 comes off as quickly as possible through the gap 77 after the predetermined impact absorption has been completed, thereby making it possible to suppress the damage that would otherwise be made to the front end module 7.

As has been described heretofore, according to the present invention, it is possible to provide the vehicle body front structure in which the proper impact absorbing function can be realized even at the lower portion of the front bumper with the simple structure.

While there have been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A vehicle body front structure comprising:
    a molded one-piece front end module disposed at a front end of a vehicle body, said molded one-piece front end module comprising:
        a radiator core support; and
        a protruding portion; and
    a front bumper including a lower portion enclosing an upper impact absorbing member and a lower impact absorbing member,
    wherein said lower impact absorbing member is supported by said protruding portion.

2. The vehicle body front structure as set forth in claim 1, wherein said protruding portion has a transverse length that is substantially equal to a transverse length of a bumper beam disposed forward of said radiator core support.

3. The vehicle body front structure as set forth in claim 2, wherein a front end surface of said protruding portion extends substantially parallel to a front end surface of said bumper beam.

4. The vehicle body front structure as set forth in claim 1, wherein a front end surface of said protruding portion extends substantially parallel to a front end surface of a bumper beam that is disposed forward of said radiator core support.

5. The vehicle body front structure as set forth in claim 1, wherein said lower impact absorbing member comprises foamed resin.

6. The structure of claim 1, further comprising a bumper beam attached to a bracket portion of the molded one-piece front end module.

7. The structure of claim 6, further comprising an upper impact absorbing member mounted on a forward face of said bumper beam.

8. The structure of claim 7, wherein said lower impact absorbing member has a greater strength resisting impact load than the upper impact absorbing member.

9. The structure of claim 6, wherein said front bumper is attached to an upper face of said bumper beam and a lower face of said protruding portion.

10. The structure of claim 1, wherein said front end module further comprises bracket portions that are integrally-formed with said radiator core support,
    wherein said front bumper further comprises an upper portion enclosing an upper impact absorbing member,
    wherein said upper impact absorbing member is supported by said bracket portions.

11. The structure of claim 1, wherein the radiator core support comprises:
    an upper member;
    a lower member; and
    a pair of side members, wherein the upper member and the lower member extend in a transverse direction of the vehicle, and the pair of side members vertically connect the upper member to the lower member,
    wherein the protruding portion is integrally-formed with the lower member.

12. The structure of claim 11, wherein the radiator core support further comprises a rear wall.

13. The structure of claim 12, wherein the upper member, the lower member and the pair of side members form a radiator accommodating portion.

14. The structure of claim 12, further comprising a plurality of ribs extending from said backside of said protruding portion to behind a lower portion of said rear wall.

15. The structure of claim 1, wherein said protruding portion comprises a plurality of ribs on a backside of said protruding portion for reinforcing the protruding portion.

16. The vehicle body front structure as set forth in claim 1, wherein said lower impact absorbing member comprises:
    a rib; and
    a plurality of beads provided between said rib and said protruding portion, to thereby transmit the impact from said rib to said protruding portion.

17. The vehicle body front structure as set forth in claim 16, wherein at least one of said beads comprises a stepped portion that is mounted to the protruding portion.

18. A vehicle body front structure comprising:
    a molded one-piece front end module that comprises:
        a radiator core support; and
        a forwardly protruding portion;
    a lower impact absorbing member supported by said forwardly protruding portion; and
    a front bumper having a lower portion that encloses the lower impact absorbing member.

19. The structure of claim 18, further comprising a bumper beam attached to a bracket of the molded one-piece front end module.

20. The structure of claim 19, further comprising an upper impact absorbing member mounted on a forward face of said bumper beam.

21. The structure of claim 20, wherein said lower impact absorbing member has a larger strength resisting impact load than the upper impact absorbing member.

22. The structure of claim 19, wherein said front bumper is attached to an upper face of said bumper beam and a lower face of said forwardly protruding portion.

23. The structure of claim 18, wherein said front end module further comprises bracket portions that are integrally-formed with said radiator core support,
    wherein said front bumper further comprises an upper portion enclosing an upper impact absorbing member,
    wherein said upper impact absorbing member is supported by said bracket portions.

24. The structure of claim 18, wherein the radiator core support comprises:
    an upper member;

a lower member; and a pair of side members, wherein the upper member and the lower member extend in a transverse direction of the vehicle, and the pair of side members vertically connect the upper member to the lower member, wherein the forwardly protruding portion is integrally-formed with the lower member.

25. The structure of claim 18, wherein said forwardly protruding portion comprises a plurality of ribs on a backside of said forwardly protruding portion for reinforcing the forwardly protruding portion.

26. A vehicle body front structure comprising:
a molded an one-piece front end module that comprises:
   a radiator core support;
   a forwardly protruding portion; and
   a bracket portion;
a lower impact absorbing member supported by the forwardly protruding portion;
a bumper beam attached to the bracket portion of the molded one-piece front end module;
an upper impact absorbing member supported by the bumper beam; and
a front bumper enclosing the lower impact absorbing member and the upper impact absorbing member.

27. The structure of claim 26, wherein the forwardly protruding portion is provided on a lower member of the radiator core support.

28. The structure of claim 26, wherein a front surface of the forwardly protruding portion is opposed substantially in parallel to a vertical surface of said front bumper.

29. The structure of claim 28, wherein said forwardly protruding portion is opposed substantially in parallel to said vertical surface of said front bumper along substantially the full transverse length of said front bumper.

30. The structure of claim 26, wherein said molded one-piece front end module further comprises a lamp housing on each side of said radiator core support.

31. The structure of claim 30, wherein said bracket portion protrudes forward at bottom portions of said lamp housings.

32. The structure of claim 26, further comprising side members fastened to said bracket portion.

33. The structure of claim 26, wherein a front end surface of said bumper beam is opposed substantially in parallel to a vertical surface of an upper protruding portion of said front bumper.

34. The structure of claim 33, wherein said front end surface of said bumper beam is opposed substantially in parallel to said vertical surface of said upper protruding portion of said front bumper across substantially the entire transverse length of said bumper beam.

35. The structure of claim 26, wherein a front end surface of said bumper beam is substantially parallel to a front end surface of said forwardly protruding portion.

36. The structure of claim 26, wherein said lower impact absorbing member has a greater impact resistance than said upper impact absorbing member.

37. The structure of claim 26, wherein said forwardly protruding portion comprises a plurality of ribs on a backside of said forwardly protruding portion for reinforcing the forwardly protruding portion.

38. A vehicle body front structure comprising:
a molded one-piece front end module disposed at a front end of a vehicle body and comprising:
   a radiator core support for holding a radiator core and a condenser; and
   a forwardly protruding portion; and
a front bumper including a lower portion enclosing a lower impact absorbing member,
wherein the radiator core support comprises an upper member, a lower member and a pair of side members,
wherein the upper member and the lower member extend in a transverse direction of the vehicle, and the pair of side members vertically connect the upper member to the lower member,
wherein the lower member comprises said forwardly protruding portion disposed at a front portion of the lower member, and
wherein the lower impact absorbing member is supported by the forwardly protruding portion.

39. The structure of claim 38, wherein the forwardly protruding portion has a transverse length that is substantially equal to a transverse length of a bumper beam disposed forward of the radiator core support.

40. The structure of claim 38, wherein a front end surface of the forwardly protruding portion extends substantially parallel to a front end surface of a bumper beam that is disposed forward of the radiator core support.

41. The structure of claim 38, wherein the lower impact absorbing member comprises foamed resin.

42. The structure of claim 38, further comprising a bumper beam attached to a bracket of the molded one-piece front end module.

43. The structure of claim 42, further comprising an upper impact absorbing member mounted on a forward face of the bumper beam.

44. The structure of claim 43, wherein the lower impact absorbing member has a greater strength resisting impact load than the upper impact absorbing member.

45. The structure of claim 42, wherein the front bumper is attached to an upper face of the bumper beam and a lower face of the forwardly protruding portion.

46. The structure of claim 45, wherein the radiator core support further comprises a bracket portion and a lamp housing on each side of the radiator core support.

47. The structure of claim 46, wherein the bracket portion protrudes at a bottom portion of at least one of the lamp housings.

48. The structure of claim 38, wherein the front end module further comprises bracket portions that are integrally-formed with the radiator core support,
wherein the front bumper further comprises an upper portion enclosing an upper impact absorbing member, and
wherein the upper impact absorbing member is supported by the bracket portions.

49. The structure of claim 38, wherein said forwardly protruding portion comprises a plurality of ribs on a backside of said forwardly protruding portion for reinforcing the forwardly protruding portion.

* * * * *